United States Patent
Mercx et al.

(10) Patent No.: US 12,325,782 B2
(45) Date of Patent: Jun. 10, 2025

(54) POLYMER FOAMS INCLUDING FUNCTIONALIZED CARBON NANOTUBES

(71) Applicant: SHPP GLOBAL TECHNOLOGIES B.V., Bergen op Zoom (NL)

(72) Inventors: Frans Mercx, Halsteren (NL); Arno Hagenaars, Bergen op Zoom (NL); Robert Van De Grampel, Tholen (NL); Sidney Vastenhout, Gravenhage (NL); Theo Hoeks, Bergen op Zoom (NL)

(73) Assignee: SHPP GLOBAL TECHNOLOGIES B.V. (NL)

( * ) Notice: Subject to any disclaimer, the term of this patent is extended or adjusted under 35 U.S.C. 154(b) by 809 days.

(21) Appl. No.: 17/298,143

(22) PCT Filed: Nov. 27, 2019

(86) PCT No.: PCT/IB2019/060261
§ 371 (c)(1),
(2) Date: May 28, 2021

(87) PCT Pub. No.: WO2020/110052
PCT Pub. Date: Jun. 4, 2020

(65) Prior Publication Data
US 2022/0049064 A1 Feb. 17, 2022

(30) Foreign Application Priority Data

Nov. 30, 2018 (EP) ..................... 18209600

(51) Int. Cl.
*C08J 9/14* (2006.01)
*C08J 9/00* (2006.01)
*C08J 9/12* (2006.01)

(52) U.S. Cl.
CPC ............ *C08J 9/0076* (2013.01); *C08J 9/122* (2013.01); *C08J 9/125* (2013.01); *C08J 9/141* (2013.01); *C08J 9/143* (2013.01); *C08J 2201/03* (2013.01); *C08J 2203/06* (2013.01); *C08J 2203/14* (2013.01); *C08J 2203/142* (2013.01); *C08J 2205/042* (2013.01); *C08J 2205/044* (2013.01); *C08J 2205/05* (2013.01); *C08J 2205/052* (2013.01); *C08J 2333/12* (2013.01); *C08J 2369/00* (2013.01); *C08J 2371/12* (2013.01); *C08J 2379/08* (2013.01); *C08J 2383/10* (2013.01); *C08J 2383/12* (2013.01)

(58) Field of Classification Search
CPC . C08J 9/0076; C08J 9/009; C08J 9/122; C08J 9/125; C08J 9/141; C08J 9/143; C08J 2201/03; C08J 2203/06; C08J 2203/14; C08J 2205/042; C08J 2205/044; C08J 2205/05; C08J 2205/052; C08J 2333/12; C08J 2369/00; C08J 2371/12; C08J 2379/08; C08J 2383/10; C08J 2383/12
See application file for complete search history.

(56) References Cited

U.S. PATENT DOCUMENTS

| | | |
|---|---|---|
| 2011/0039089 A1 | 2/2011 | El Bounia et al. |
| 2013/0018112 A1 | 1/2013 | Thielemans et al. |
| 2015/0018490 A1* | 1/2015 | Takagiwa ............. C08F 120/06 525/327.4 |
| 2016/0104554 A1* | 4/2016 | Zhong .................... B29C 39/14 252/511 |
| 2018/0036713 A1 | 2/2018 | Li et al. |
| 2018/0257043 A1 | 9/2018 | Li et al. |

FOREIGN PATENT DOCUMENTS

| | | |
|---|---|---|
| CN | 102046709 | 5/2011 |
| CN | 102666669 | 9/2012 |
| CN | 105778257 | 7/2016 |
| CN | 106566156 | 4/2017 |
| CN | 108570155 | 9/2018 |
| WO | WO 2010/059008 | 5/2010 |
| WO | WO 2020110052 | 6/2020 |

OTHER PUBLICATIONS

European Search Report issued in corresponding European Application No. 19813950.3, dated Oct. 13, 2023.
Costeux, S., "CO2-Blown Nanocellular Foams", *Journal of Applied Polymer Science*, 131; 1-16, 2014.
Liu, H. et al., "Thermal Conductivity Analysis of High Porosity Structures with Open and Closed Pores", *International Journal of Heat and Mass Transfer*, 183; 122089, 2022.
Sánchez-Calderón, I. et al., "Thermal conductivity of low-density micro-and nanocellular poly (methyl-methacrylate) (PMMA): Experimental and modeling", *Material & Design*, 221; 110938, 2022.
Office Action issued in corresponding Chinese Application No. 201980090444. dated Apr. 26, 2022.
Extended European Search Report and Written Opinion for Application No. 18209600.8, mailed Jan. 24, 2019, 8 pages.

(Continued)

Primary Examiner — John M Cooney
(74) Attorney, Agent, or Firm — Norton Rose Fulbright US LLP

(57) ABSTRACT

This disclosure describes micro, sub-micro, and nano-cellular polymer foams formed from a polymer composition that includes a polymer and functionalized carbon nanotubes, and systems and methods of formation thereof. The microcellular polymer foam has an average pore size within a range of 1 micron to 100 microns, the sub-microcellular polymer foam has an average pore size within a range of 0.5 microns to 1 micron, and the nano-cellular polymer foam has an average pore size within a range of 10 nanometers to 500 nanometers. In other aspects, this disclosure describes micro, sub-micro, and nano-cellular polymer foams formed from a polymer composition that includes a polymer and non-functionalized carbon nanotubes.

18 Claims, 4 Drawing Sheets

(56) References Cited

OTHER PUBLICATIONS

International Search Report and Written Opinion for Application No. PCT/IB2019/060261, mailed Jan. 20, 2020, 16 pages.

Zeng, Changchun, et al. "Synthesis and processing of PMMA carbon nanotube nanocomposite foams." Polymer 51.3 (2010): 655-664.

Office Action issued in corresponding European Application No. 18209600.8, filed Aug. 1, 2024.

* cited by examiner

POLYMER FOAMS INCLUDING FUNCTIONALIZED CARBON NANOTUBES

CROSS-REFERENCE TO RELATED APPLICATIONS

This application is a national phase application under 35 U.S.C. § 371 of International Application No. PCT/IB2019/060261, filed Nov. 27, 2019, which claims the benefit of priority of European Patent Application No. 18209600.8 filed Nov. 30, 2018, which are hereby incorporated by reference in their entirety.

FIELD OF INVENTION

The present disclosure relates generally to polymer foams, and, but not by way of limitation, to methods and systems for producing polymer foams, such as polymer foams formed from a polymer composite that includes carbon nanotubes.

BACKGROUND

Microcellular foams have property benefits over regular foams. For instance, microcellular foaming has enabled weight reduction (10-30%) with minimal decrease in mechanical strength, over regular foams. Due to reduced cell size, microcellular foams interfere with crack propagation, and impact properties and toughness are increased as compared to large cellular foams (e.g., foams having cell sizes greater than 100 microns). Additionally, polymer nano-cellular foams with cell sizes of 100 nm or less possess unique thermal conductivity, optical, or mechanical properties over microcellular foams. However, cell walls and cell struts of polymer foams can collapse during formation (e.g., a foaming process) and limit foam cell (pore) density and weight of the foam. This is especially prevalent in nano-cellular foams. Cell walls and cell struts of nano-cellular foams are extremely thin and prone to collapse during formation in a nanofoaming process, which limits foam cell density and weight of the foam. Therefore, there is a need for polymer foams having enhanced properties, and methods for making the foams.

SUMMARY

The present disclosure describes micro, sub-micro, and/or nano-cellular polymer foams, and methods, devices, and systems to form micro, sub-micro, and/or nano-cellular polymer foams. The polymer foams described herein include/encompass microcellular foams, sub-microcellular foams, nano-cellular foams, and hybrid foams having micro, sub-micro, and/or nano-sized cells. As used herein, microcellular foams includes foams having an average pore (cell) size of 1 to 100 microns, sub-microcellular foams includes foams having an average pore (cell) size of 0.5 to 1 micron, and nano-cellular foams includes foams having an average pore (cell) size of 10 to 500 nanometers. The polymer foams described herein include one or more polymers and functionalized carbon nanotubes and have an average pore size from substantially 10 nanometers to substantially 100 microns. Additionally, or alternatively, functionalized carbon nanotubes have increased bonding and adhesion to polymers as compared to conventional carbon nanotubes. For example, functional groups (e.g., oxygen based functional groups) of the functionalized carbon nanotubes contribute to increased adhesion between the functionalized carbon nanotubes and a polymer host of the polymer composition. The increased bonding/adhesion and dispersion of the functionalized carbon nanotubes to the polymers prevents cell wall and cell strut collapse by providing strength to the polymer foam, such as by reinforcing the polymer molecules and chains thereof.

The polymer foams described herein provide enhanced mechanical properties (e.g., modulus and impact resistance). For example, increased pore/cell density, due to reduced collapsing of cell wall and struts reinforced by functionalized carbon nanotubes, can improve loading and impact resistance of the polymer foam while also reducing the weight of the polymer foam. Additionally or alternatively, functionalized carbon nanotubes dispersed/aligned in cell walls and struts of the polymer can further improve loading and impact resistance of the polymeric foam. In addition, depending on a loading/amount of functionalized carbon nanotubes, conductive, antistatic, or electromagnetic interference shielding polymer foams can be produced. Thus, the polymer foam (and components made therefrom) can offer better impact resistance and improved thermal insulation, as compared to polymer foams that do not include functionalized carbon nanotubes. Additionally, the polymer foam described herein enables products to be made lighter and smaller and still achieve a designed impact rating and/or thermal insulation, as compared to polymer foams that do not include functionalized carbon nanotubes.

Nano-cellular polymer foams exhibit a significantly higher strain to failure, resulting in an improvement in the modulus of toughness by up to 350% compared to microcellular polymer foams. Additionally, impact energies of nano-cellular polymer foams are up to 600% higher as compared to microcellular polymer foams.

In a particular implementation, the functionalized carbon nanotubes have multiple walls and one or more oxygen based functional groups. The functionalized carbon nanotubes typically have an oxidation level between 3 and 25 wt % as determined by thermogravimetric analysis (TGA). The functionalized carbon nanotubes have increased bonding and adhesion to polymers as compared to conventional carbon nanotubes. For example, functional groups (e.g., oxygen based functional groups) of the functionalized carbon nanotubes contribute to increased adhesion between the functionalized carbon nanotubes and a polymer host of the polymer composition. Additionally, the polymer composition may have increased dispersion of the functionalized carbon nanotubes in the polymer composition. The increased bonding/adhesion and dispersion of the functionalized carbon nanotubes to the polymers prevents cell wall and cell strut collapse by providing strength to the polymer foam, such as by reinforcing the polymer molecules and chains thereof.

The polymer foams disclosed herein may be open cell or closed cell. As disclosed herein, the term "cell" is defined as a void cavity that makes up the foam. The cells may comprise an "open cell structure", a "closed cell structure", or combinations thereof. An "open cell structure" is defined as a void cavity that is open at one or more sides. Open cell structures may connect to other open or closed cell structures. A "closed cell structure" is defined as a void cavity with no opening. A closed cell structure may or may not be present on the surface of a polymer foam. If present, the skin of the closed cell may form a part of the foam surface.

An average pore (cell) size of the polymer foams described herein can be determined by cryo-fracturing a foam part to generate a sample. To illustrate, the foam part is quickly frozen with liquid nitrogen or another freezing agent and is broken with a sharp blow to generate the sample. A representative portion (e.g., an area having dimensions between 2 microns by 2 microns and 10 microns by 10 microns) of a cross section of the sample is analyzed by an electron microscope (e.g., an SEM) to determine a maximum transverse dimension and a minimum transverse dimension for a number of random pores (e.g., 50-200) of the sample. To illustrate, the maximum and minimum pore widths are determined for 100 pores, which are randomly selected or pseudo-randomly selected from a 5 micron by micron section of the sample, to generate the average pore size value for the sample and the foam part.

"Carbon nanotubes" as used herein refers to allotropes of carbon with a cylindrical nanostructure. The carbon nanotubes may be formed of one-atom-thick sheets (e.g., graphitic sheets) of carbon atoms, i.e. graphene. The sheets are rolled at specific and discrete ("chiral") angles, and the combination of the rolling angle and radius affects nanotube properties. Although a majority of the carbon atoms of the sheets are exposed, the sheets (i.e., the carbon atoms thereof) are relatively inert and do not adhere well to a host material (e.g., a polymer matrix).

"Functionalized carbon nanotubes" as used herein refers to carbon nanotubes whose surfaces are uniformly or non-uniformly modified so as to have a functional chemical moiety associated therewith. These surfaces are functionalized by reaction with oxidizing or other chemical media through chemical reactions or physical adsorption. Functionalized carbon nanotubes can then be further modified by additional reactions to form other functional moieties on the surfaces of the carbon nanotubes. By changing the chemical moieties on the surfaces of the carbon nanotube, the functionalized carbon nanotubes can be physically or chemically bonded to a wide variety of substrates, including polymers. The carbon nanotubes (e.g., double-walled or multi-walled) used to produce the functionalized carbon nanotubes may be grown or formed by conventional processes, such as chemical vapor deposition (CVD) and/or another process.

Functionalized carbon nanotubes, which can be well dispersed in a polymer matrix through polar or covalent interaction, have better adhesion to the host polymer matrix and increase porosity in foams created therefrom, as compared to conventional carbon nanotubes. Improved interaction/adhesion (as compared to conventional carbon nanotubes) between the functional carbon nanotubes and the polymer matrix improves mechanical properties of cell walls and cell struts during formation of polymer foams. The functionalized carbon nanotubes can be said to reinforce the polymer matrix. Thus, polymer foams can be formed with a higher pore density and lower weight, as compared to conventional polymer foams (e.g., foams without functional carbon nanotubes) because fewer cell walls and struts collapse. Additionally, or alternatively, cell wall and struts can be made thinner. Furthermore, the use of certain compatibilizers in combination with functionalized carbon nanotubes allows improving the compatibilization/adhesion to the host polymer matrix (e.g., polymer resin) and further improves pore density and reduces weight.

As an illustrative example of functionalization of carbon nanotubes, double-walled and/or multi-walled carbon nanotubes are oxidized through either wet chemical methods or plasma treatments and are modified by oxidation to become shortened and oxidized. The oxidation process causes functional groups (e.g., oxygen based functional groups or oxygen functionalities) to form on sidewalls of the oxidized multi-walled carbon nanotubes. The functional groups are able to form covalent or polar bonds with polymer molecules (e.g., polymer chains) of the polymer to better adhere the functionalized carbon nanotubes to the polymer molecules than bonding unoxidized or unmodified carbon atoms of the functionalized carbon nanotubes or conventional carbon nanotubes to the polymer molecules.

In a particular implementation, oxygen functional groups of functionalized carbon nanotubes have increased polar interactions (e.g., coulomb, hydrogen bonding) and/or increased chemical bonding with a host material (e.g., a polymer matrix). The increased interaction and bonding strength thereof may result in increased mechanical properties, such as shear strength. Thus, when a polymer composite undergoes a foaming process cell walls and struts formed by the polymer composite are more reliant to foaming forces and collapse, and polymer foams made therefrom have increased pore density and reduced weight. Additionally, the functionalized carbon nanotubes may have improved dispersion (e.g., produce less "clumping" or agglomerates) in polymers as compared to carbon nanotubes, which may further increase mechanical properties and lead to higher pore density and reduced weight.

The functionalized carbon nanotubes may be combined with (e.g., blended with) polymers, such as in a melt-compounding operation, to produce polymer compositions, and/or products made therefrom with a conductivity level that satisfies a threshold (e.g., is greater than or equal to the threshold). Polymer foams made from the polymer composition may exhibit increased mechanical properties. Thus, during forming (e.g., a solid state foaming process, an extrusion foaming process, a bead foaming process or an injection molding foaming process) polymer foams made from the polymer composition have reduced weight and increased pore density. Batch formation methods and continuous formation methods can be used. Additionally, depending on concentrations of the functionalized carbon nanotubes, polymer foam can be made electrically conductive.

Thus, the present disclosure describes polymer foams with improved pore density and reduced weight, and methods and systems for producing the polymer foams with improved pore density and reduced weight. As described herein, the polymer foams with improved pore density and reduced weight, may be formed by a solid state foaming process, an extrusion foaming process, a bead foaming process or an injection molding foaming process. The polymer composite includes a polymer and functionalized carbon nanotubes, such as multi-walled carbon nanotubes having oxygen functional groups (e.g., functionalities). The functionalized carbon nanotubes (e.g., the oxygen functional groups thereof) contribute to increased adhesion between the functionalized carbon nanotubes the polymer host of the polymer composition. Additionally, the polymer composition may have increased dispersion of the functionalized carbon nanotubes in the polymer composition.

The polymer foams (including the functionalized carbon nanotubes) may advantageously have an increased pore density and a reduced foam weight. Additionally, the polymer foams can be designed to meet a particular conductivity, i.e., can be electrically conductive, antistatic, or electromagnetically shielding. One particular product that can benefit from such a polymer foams is thermal insulation. Other particular products that can benefit from such a polymer foam structure are membranes and filters. Accordingly, the present disclosure overcomes the existing challenges of cell wall and cell strut collapse in polymer foams.

Some embodiments of the present polymer foams comprise: one or more polymers; and functionalized carbon nanotubes, where the polymer foam has an average pore size within a range of 10 nanometers to 100 microns. In some implementations, the polymer foam has an average pore size of less than or equal to 100 nanometers. Additionally, or alternatively, the polymer foam has a cell density of greater than or equal to 10E12 cells per cubic centimeter.

In some of the foregoing embodiments of the polymer foams, the polymer foam has a foam density within a range of 1 percent to 50 percent of a bulk density of a material comprising the polymer foam. Additionally, or alternatively, the polymer foam comprises a thermal conductivity of 0.001 to 0.01 Watts per meter-Kelvin.

In some of the foregoing embodiments of the polymer foams, the functionalized carbon nanotubes are dispersed in the one or more polymers, the polymer foam, or both. Additionally, or alternatively, the functionalized carbon nanotubes are aligned with each other in the one or more polymers, the polymer foam, or both. In some of the foregoing embodiments of the polymer foams, cells of the polymer foam comprise an open cell structure, a closed cell structure, or a combination thereof.

In some of the foregoing embodiments of the polymer foams, at least one polymer of the one or more polymers is selected from the group consisting of polycarbonate, polycarbonate-siloxane copolymers, polyetherimide, polyetherimide-siloxane copolymers, polymethylmethacrylate (PMMA), polyphenylene ether (PPE)-siloxane copolymers, and a combination thereof. In some of the foregoing embodiments of the polymer foams, the polymer foam is transparent or substantially transparent.

In some of the foregoing embodiments of the polymer foams, the functionalized carbon nanotubes have one or more characteristics selected from the group of: a length between 0.4 to 15 microns, include 2 to 15 walls, an oxidation level between 3 and 25 wt % as determined by thermogravimetric analysis (TGA), or a combination thereof. Additionally, or alternatively, the polymer foam further comprises carbon black, carbon fibers, graphene, non-functionalized multi-wall carbon nanotubes, single-walled functionalized or non-functionalized carbon nanotubes, or a combination thereof.

Some embodiments of the present methods comprise: receiving a polymer composition including one or more polymers and functionalized carbon nanotubes; and forming the polymer foam based on the polymer composition, where the polymer foam has an average pore size within a range 10 nanometers to 100 microns. In some implementations of the embodiments of the present methods, forming the polymer foam based on the polymer composition includes processing the polymer composition by a solid state foaming process, an extrusion foaming process, a bead foaming process or an injection molding foaming process. In some implementations of the embodiments of the present methods, the method further comprises combining, at an extrusion device, the polymer, the functionalized carbon nanotubes, and a foaming agent to form a saturated-polymer composition; and providing, from the extrusion device to a die, the saturated-polymer composition, where the foaming agent undergoes nucleation and expansion in the polymer composition to form the polymer foam. In some implementations, a polymer foam formed by some of the foregoing embodiments of the present methods is conductive, antistatic, or electrically static dissipative.

Some embodiments of the present polymer foams comprise: one or more polymers; and non-functionalized carbon nanotubes, where the non-functionalized carbon nanotubes have a length between 0.4 to 15 microns, and where the polymer foam has an average pore size within a range of 10 nanometers to 100 microns.

In some implementations of the embodiments of the present polymer foams, the polymer foam has an average pore size of less than or equal to 100 nanometers. Additionally, or alternatively, the polymer foam has a cell density of greater than or equal to 10E12 cells per cubic centimeter.

In some implementations of the embodiments of the present polymer foams, the polymer foam has a foam density within a range of 1 percent to 50 percent of a bulk density of a material comprising the polymer foam. Additionally, or alternatively, the polymer foam comprises a thermal conductivity of 0.001 to 0.01 Watts per meter-Kelvin.

In some implementations of the embodiments of the polymer foams, the non-functionalized carbon nanotubes are dispersed in the one or more polymers, the polymer foam, or both. Additionally, or alternatively, the non-functionalized carbon nanotubes are aligned with each other in the one or more polymers, the polymer foam, or both. In some implementations of the embodiments of the present polymer foams, cells of the polymer foam comprise an open cell structure, a closed cell structure, or a combination thereof, and wherein the polymer foam is transparent or substantially transparent.

In some implementations of the embodiments of the present polymer foams, the at least one polymer of the one or more polymers is selected from the group consisting of polycarbonate, polycarbonate-siloxane copolymers, polyetherimide, polyetherimide-siloxane copolymers, polymethylmethacrylate (PMMA), polyphenylene ether (PPE)-siloxane copolymers, and a combination thereof.

In some implementations of the embodiments of the present polymer foams, the non-functionalized carbon nanotubes comprise non-functionalized multi-wall carbon nanotubes, and further comprising carbon black, carbon fibers, graphene, functionalized multi-wall carbon nanotubes, single-walled functionalized carbon nanotubes, single-walled functionalized non-functionalized carbon nanotubes, or a combination thereof. Additionally, or alternatively, the non-functionalized carbon nanotubes comprise multi-wall carbon nanotubes and include 2 to 15 walls.

Some embodiments of the present methods comprise: receiving a polymer composition including one or more polymers and non-functionalized carbon nanotubes, where the non-functionalized carbon nanotubes have a length between 0.4 to 15 microns; and forming the polymer foam based on the polymer composition, where the polymer foam has an average pore size within a range 10 nanometers to 100 microns.

In some implementations of the embodiments of the present methods, forming the polymer foam based on the polymer composition includes processing the polymer composition by a solid state foaming process, an extrusion foaming process, a bead foaming process or an injection molding foaming process.

In some implementations of the embodiments of the present methods, the method further comprises: combining, at an extrusion device, the polymer, the non-functionalized carbon nanotubes, and a foaming agent to form a saturated-polymer composition; and providing, from the extrusion device to a die, the saturated-polymer composition, wherein the foaming agent undergoes nucleation and expansion in the polymer composition to form the polymer foam. In some implementations, a polymer foam formed by some of the foregoing embodiments of the present methods is conductive, antistatic, or electrically static dissipative.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementation, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any implementation of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where." Further, a device or system that is configured in a certain way is configured in at least that way, but it can also be configured in other ways than those specifically described. The feature or features of one implementation may be applied to other implementations, even though not described or illustrated, unless expressly prohibited by this disclosure or the nature of the implementations. Some details associated with the implementations are described above, and others are described below. Other implementations, advantages, and features of the present disclosure will become apparent after review of the entire application, including the following sections: Brief Description of the Drawings, Detailed Description, and the Claims.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the implementation depicted in the figures. Views identified as schematics are not drawn to scale.

DETAILED DESCRIPTION OF ILLUSTRATIVE IMPLEMENTATIONS

Figure 1:
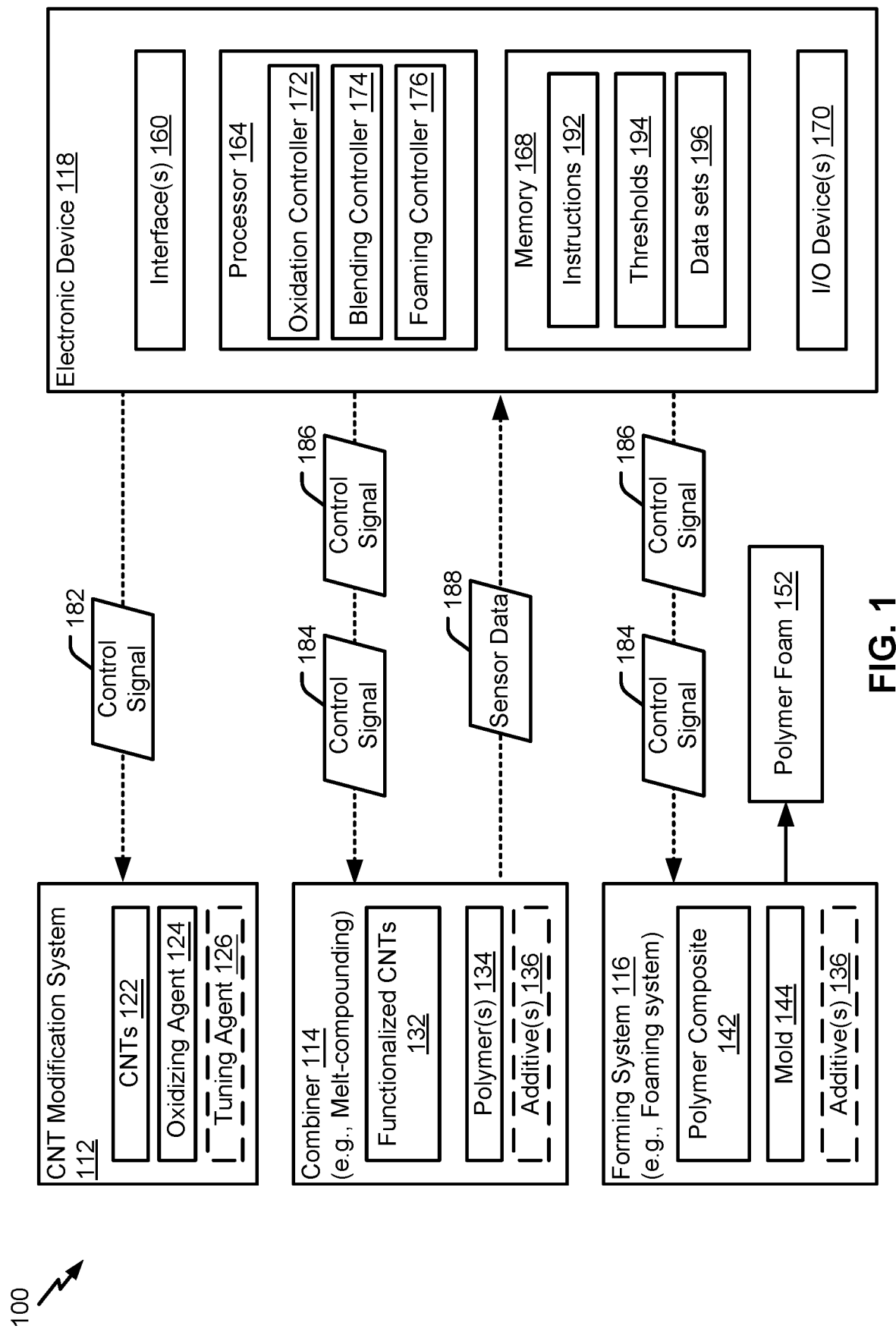
FIG. 1 is a diagram that illustrates an example of a system for manufacturing polymer foam using a polymer composition including functionalized carbon nanotubes.

Referring to FIG. 1, FIG. 1 shows a block diagram of a system 100 for manufacturing a polymer foam 152. Polymer foam 152 includes a polymer composite 142 that includes functionalized carbon nanotubes 132. Polymer foam 152 has increased pore density and reduced weight, as compared to polymer foams that include conventional carbon nanotubes (e.g., do not include functionalized carbon nanotubes), and may be electrically conductive.

System 100 includes a CNT modification system 112, a combiner 114, a forming system 116 (e.g., foaming system), and an electronic device 118. CNT modification system 112 is configured to generate functionalized carbon nanotubes 132 from carbon nanotubes 122 and an oxidizing agent 124. CNT modification system 112 may include or correspond to a wet etch or plasma treatment oxidation system which is configured to oxidize the carbon nanotubes 122 to form functional groups thereon, thereby creating functionalized carbon nanotubes 132. In some implementations, the carbon nanotubes 122 are formed by chemical vapor deposition (CVD). Functionalized carbon nanotubes 132 are described further with reference to FIG. 2.

Combiner 114 is configured to create a polymer composite 142 (e.g., a blended composition) from functionalized carbon nanotubes 132 and one or more polymers 134. Combiner 114 may include or correspond to a melt-compounding system or a melt-blend combiner. Polymer composite 142 and polymer 134 are described further with reference to FIG. 2. Forming system 116 is configured to generate a polymer foam 152 using the polymer composite 142. Forming system 116 may include or correspond to solid state foaming system, an extrusion foaming system, or a bead foaming system. Although listed as separate systems, combiner 114 and forming system 116 may be incorporated into a single system, such as described with reference to FIG. 3.

Electronic device 118 includes one or more interfaces 160, one or more processors (e.g., one or more controllers), such as a representative processor 164, a memory 168, and one or more input/output (I/O) devices 170. Interfaces 160 may include a network interface and/or a device interface configured to be communicatively coupled to one or more other devices, such as CNT modification system 112, combiner 114, or forming system 116. For example, interfaces 160 may include a transmitter, a receiver, or a combination thereof (e.g., a transceiver), and may enable wired communication, wireless communication, or a combination thereof. Although electronic device 118 is described as a single electronic device, in other implementations system 100 includes multiple electronic devices. In such implementations, such as a distributed control system, the multiple electronic devices each control a sub-system of system 100, such as CNT modification system 112, combiner 114, or forming system 116.

Processor 164 includes oxidation controller 172, blending controller 174, and forming controller 176 (e.g., a foaming controller). For example, oxidation controller 172 (e.g., processor 164) may be configured to generate and/or communicate one or more oxidation control signals 182 to CNT modification system 112. Blending controller 174 is configured to control (or regulate) an environment, such as an air quality, temperature, and/or pressure, within combiner 114 (e.g., a chamber or extruder thereof) and/or delivery/injection of materials into combiner 114. For example, blending controller 174 may be configured to generate and/or communicate one or more environment control signals 184 to combiner 114, one or more ingredient delivery control signals 186 to combiner 114, or a combination thereof.

Forming controller 176 is configured to control (or regulate) an environment, such as a temperature (e.g., heat) and/or pressure, within forming system 116 (e.g., an extruder thereof) and/or delivery/injection of materials into forming system 116 (e.g., an extruder thereof). For example, forming controller 176 may be configured to generate and/or communicate one or more environment control signals 184 to forming system 116, one or more ingredient delivery control signals 186 to forming system 116, or a combination thereof.

Although one or more components of processor 164 are described as being separate components, at in some implementations, one or more components of the processor 164 may be combined into a single component. For example, although oxidation controller 172 and blending controller 174 are described as being separate, in other implementations, oxidation controller 172 and blending controller 174 may be incorporated into a single controller. Additionally, or alternatively, one or more components of processor 164 may be separate from (e.g., not included in) processor 164. To illustrate, oxidation controller 172 may be separate and distinct from processor 164.

Memory 168, such as a non-transitory computer-readable storage medium, may include volatile memory devices (e.g., random access memory (RAM) devices), nonvolatile memory devices (e.g., read-only memory (ROM) devices, programmable read-only memory, and flash memory), or both. Memory 168 may be configured to store instructions 192, one or more thresholds 194, and one or more data sets 196. Instructions 192 (e.g., control logic) may be configured to, when executed by the one or more processors 164, cause the processor(s) 164 to perform operations as described further here. For example, the one or more processors 164 may perform operations as described with reference to FIGS. 3-6. The one or more thresholds 194 and one or more data sets 196 may be configured to cause the processor(s) 164 to generate control signals. For example, the processors 164 may generate and send control signals responsive to receiving sensor data, such as sensor data 188 from combiner 114. The temperature or ingredient flow rate can be adjusted based on comparing sensor data to one or more thresholds 194, one or more data sets 196, or a combination thereof.

In some implementations, processor 164 may include or correspond to a microcontroller/microprocessor, a central processing unit (CPU), a field-programmable gate array (FPGA) device, an application-specific integrated circuits (ASIC), another hardware device, a firmware device, or any combination thereof. Processor 164 may be configured to execute instructions 192 to initiate or perform one or more operations described with reference to FIG. 3 and/or one more operations of the methods of FIGS. 4-6.

The one or more I/O devices 170 may include a mouse, a keyboard, a display device, the camera, other I/O devices, or a combination thereof. In some implementations, the processor(s) 164 generate and send control signals responsive to receiving one or more user inputs via the one or more I/O devices 170.

Electronic device 118 may include or correspond a communications device, a mobile phone, a cellular phone, a satellite phone, a computer, a tablet, a portable computer, a display device, a media player, or a desktop computer. Additionally, or alternatively, the electronic device 118 may include a set top box, an entertainment unit, a personal digital assistant (PDA), a monitor, a computer monitor, a television, a tuner, a video player, any other device that includes a processor or that stores or retrieves data or computer instructions, or a combination thereof.

During operation of system 100, functionalized carbon nanotubes 132 are formed from carbon nanotubes 122 (e.g., received or grown double-wall or multi-wall carbon nanotubes). For example, CNT modification system 112 modifies (i.e., functionalizes) carbon nanotubes 122 by applying oxidizing agent 124 via wet etching or plasma treatment to oxidize carbon nanotubes 122 to form functionalized carbon nanotubes 132. To illustrate, oxidation controller 172 may send one or more oxidation control signals 182 to CNT modification system 112. The oxidation control signals 182 may include signals configured to cause CNT modification system 112 to apply liquid chemical etches using oxidizing agent 124 or plasma treatments using oxidizing agent 124 to the carbon nanotubes 122 to oxidize the carbon nanotubes 122, such as sidewall carbon atoms thereof. Additionally, CNT modification system 112 can perform ozonization (i.e., apply $O_3$) to oxidize carbon nanotubes 122. Oxidizing the carbon nanotubes 122 forms functionalized carbon nanotubes 132 by oxidizing carbon atoms and/or attaching/forming a functional oxygen group bonded to the carbon atoms, specifically sidewall carbon atoms, as described further with reference to FIG. 2. Additionally, functional groups may be bonded to carbon atoms of nanotube ends.

In a particular implementation, oxidizing agent 124 includes nitric acid or a nitric acid and sulfuric acid mixture. The nitric acid and sulfuric acid mixture may be an aqueous mixture. Additionally, the oxidizing agent 124 may further treat carbon nanotubes 122 to prepare the carbon nanotubes 122 for bonding to the polymer 134. For example the nitric acid or the nitric acid and sulfuric acid mixture removes metal residues from (e.g., left behind by) catalysts used to form the carbon nanotubes, specifically catalysts used during a CVD process to grow/form carbon nanotubes 122.

Additionally, the oxidation control signals 182 may include signals configured to cause CNT modification system 112 to rinse the oxidized carbon nanotubes 122 (e.g., the functionalized carbon nanotubes 132) to remove contaminants. In some implementations, the oxidized carbon nanotubes 122 are further treated with tuning agent 126 by CNT modification system 112. To illustrate, CNT modification system 112 applies tuning agent 126 to further modify the oxidized carbon nanotubes 122 by modifying functional groups attached to the oxidized carbon nanotubes 122. To illustrate, tuning agent 126 reacts with one or more of the functional groups of the oxidized carbon nanotubes 122 to chemically modify the functional groups for increased adhesion to polymer 134 and to generate functionalized carbon nanotubes 132. In other implementations, carbon nanotubes 122 are processed to form functionalized carbon nanotubes 132 by amidixation (e.g., imidization) and/or epoxidation, as opposed to oxidation.

After generation of functionalized carbon nanotubes 132 (and optionally tuning/further modification thereof), the functionalized carbon nanotubes 132 are provided to combiner 114. A polymer composite 142 (e.g., a polymer composition) is generated by the combiner 114. For example, the combiner 114 combines (e.g., mixes or blends), responsive to control signals 184, 186 from the blending controller 174, functionalized carbon nanotubes 132 and polymer 134 (and optionally additive(s) 136). To illustrate, blending controller 174 may send one or more environment control signals 184 to combiner 114 to adjust conditions (e.g., temperature, pressure, air quality) of the combiner 114 or conditions of the polymer composite 142 (viscosity, temperature, etc.). Additionally or alternatively, blending controller 174 may send one or more ingredient delivery control signals 186 to combiner 114 to adjust rates and or amounts of functionalized carbon nanotubes 132, polymer 134, one or more additives 136, or any combination thereof. Exemplary additives for increasing conductivity include carbon black, carbon fibers, graphene, non-functionalized multi-walled carbon nanotubes, single-walled functionalized or non-functionalized carbon nanotubes, or a combination thereof.

After formation of polymer composite 142, the polymer composite 142 is provided to forming system 116, and forming system 116 forms or generates polymer foam 152. For example, forming system 116 may form polymer foam 152 via a solid state foaming process, an extrusion foaming process, a bead foaming process or an injection molding foaming process, as described further herein. To illustrate, forming controller 176 may send or more control signals to control delivery (e.g., injection) of polymer composite 142 to an extruder of forming system 116.

Additionally or alternatively, forming controller 176 may send or more control signals to control foaming of polymer composite 142, such as control application of temperature and pressure to an extruder to control foaming rate and/or size. Forming controller 176 may further send or more control signals to control cooling of saturated-polymer composite 142 (polymer composite with a dissolved foaming agent between polymer 134 particles thereof) and extrusion of saturated-polymer composite 142 from the extruder.

The polymer foam 152 (or a part incorporating polymer foam 152) includes (and is formed from) polymer composite 142 that enables desired conductivity and reduced weight. Polymer composite 142 and/or polymer foam 152 may include enhanced mechanical properties. Accordingly, the present disclosure overcomes the existing challenges of forming polymer foams with increased pore density and reduced weight by incorporating functionalized carbon nanotubes, as described herein, into the polymer composite. The polymer foams enable unique mechanical, thermal, electrical and optical properties.

Polymer foam 152 can include or correspond to a microcellular foam, a sub-microcellular foam, a nano-cellular foam, or a hybrid foam having micro, sub-micro, and/or nano-sized cells. For example, polymer foam 152 can be microcellular and have an average cell size of 1 to 100 microns, can be sub-microcellular and have an average cell size of 0.5 to 1 micron, or can be nano-cellular and have an average cell size of 10 to 500 nanometers. In some implementations, nano-cellular polymer foam 152 has an average pore size of 10 to 500 nanometers. In other implementations, polymer foam 152 has an average pore size of substantially between any two of: 5, 6, 7, 8, 9, 10, 20, 30, 40, 50, 60, 80, 100, 150, 180, 19, 200, 202, 205, or 210 nanometers. Additionally, or alternatively, nano-cellular polymer foam 152 has an average pore size of less than or equal to 100 nanometers.

In some implementations, polymer foam 152 has a cell density of greater than substantially 10E12 cells per cubic centimeter. In a particular implementations, polymer foam 152 has a cell density of greater than substantially 10E15 cells per cubic centimeter. In other implementations, polymer foam 152 has an average pore size of less greater than or equal to substantially one of: 10E10, 10E12, 10E13, 10E14, 10E16, 10E18, 10E20, or 10E22 cells per cubic centimeter.

In some implementations, polymer foam 152 has a foam density that is from substantially 1 percent to substantially 50 percent of a bulk density of a material comprising the polymer foam 152 (i.e., the polymer composite 142). In a particular implementations, polymer foam 152 has a foam density that is from substantially 5 percent to substantially 20 percent of the bulk density of the material comprising the polymer foam 152. In other implementations, polymer foam 152 has a foam density that is substantially between any two of: 0.5, 1, 2, 5, 10, 15, 20, 25, 30, 35, 40, 45, 50 percent of the bulk density of the material comprising the polymer foam 152.

In some implementations, polymer foam 152 comprises a thermal conductivity of substantially 0.001 to substantially 0.01 Watts per meter-Kelvin. In a particular implementation, polymer foam 152 comprises a thermal conductivity of substantially 0.001 to substantially 0.01 Watts per meter-Kelvin over a temperature range of ambient temperature (e.g., 23 degrees Celsius) to substantially 350 degrees Celsius. In other implementations, polymer foam 152 comprises a thermal conductivity of substantially 0.001 to substantially 0.05 Watts per meter-Kelvin. In some such implementations, polymer foam 152 comprises the thermal conductivity over a temperature range of substantially ambient temperature to substantially 350 degrees Celsius.

In some implementations, the functionalized carbon nanotubes 132 are dispersed and/or aligned with each other in the polymer foam 152. Dispersion and alignment of functionalized carbon nanotubes 132 increase mechanical properties (e.g., loading and impact resistance) and increase electrical properties (e.g., conduction).

In some implementations, cells of polymer foam 152 comprise an open cell structure, a closed cell structure, or a combination thereof. In a particular implementation, polymer foam 152 is substantially comprised of open cell structures. In another particular implementation, polymer foam 152 is substantially comprised of a closed cell structures.

In some implementations, the polymer foam 152 is transparent, such as has a refractive index between 1 and 2. In other implementations, the polymer foam 152 is substantially transparent, such as has a refractive index between 2 and 3. For example, the polymer foam 152 is transparent or substantially transparent to a particular portion of electromagnetic radiation, such as visible light or infrared light. The cell size, foam density, and polymer material affect the transparency of polymer foam 152. For example, reduced foam density increases transparency and the cell size often corresponds to a particular portion of electromagnetic radiation.

Additionally, in some implementations polymer foam 152 has a particular conductivity and/or shielding property. For example, polymer foam 152 may be electrically static dissipative (ESD), anti-static or EMI resistant. To illustrate, polymer foam 152 has a surface resistivity of E+05 to E+11 Ohm/square to provide protection against ESD or has a surface resistivity smaller than E+05 Ohm/square to shield against EMI (i.e., be EMI resistant).

Figure 2:
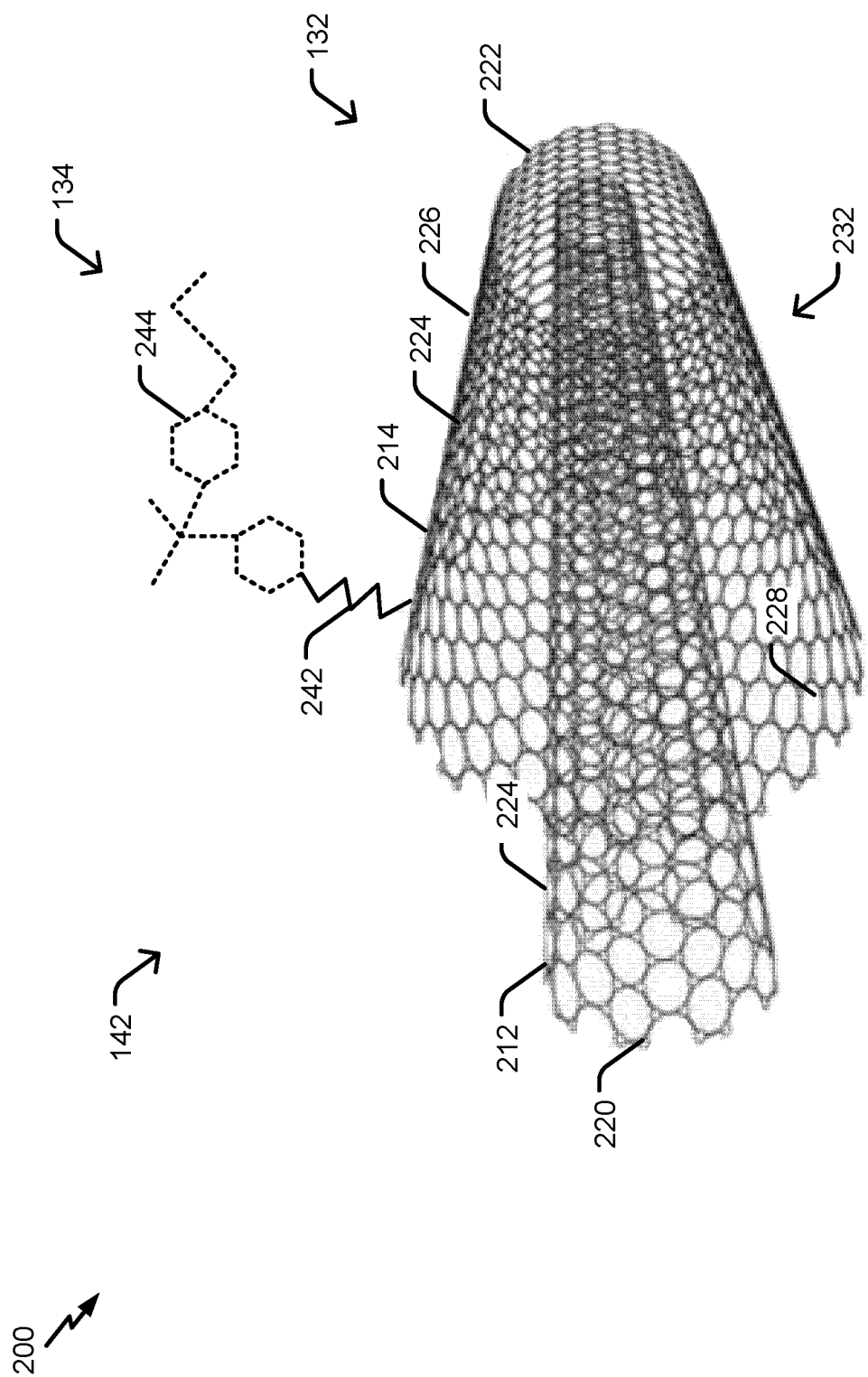
FIG. 2 is a diagram that illustrates a perspective view of an example of the polymer composition of FIG. 1.

Referring to FIG. 2, a perspective view 200 of an example of polymer composite 142 of FIG. 1 is shown. Polymer composite 142 is a polymer composition (e.g., a blended composition) and includes one or more polymers 134 and functionalized carbon nanotubes 132. FIG. 2 represents a simplification of polymer composite 142 illustrating a single, multi-walled carbon nanotube 232 having a single functional group 242 attached thereto, and illustrating a single polymer chain 244 of polymer 134 attached to functional group 242. Although, polymer composite 142 is illustrated as including a multi-walled carbon nanotube 232 (i.e., a double-walled carbon nanotube), in other implementations polymer composite 142 includes single-walled carbon nanotubes, double-walled carbon nanotubes, multi-walled carbon nanotubes, or a combination thereof. The multi-walled carbon nanotubes may have a concentric tube form, as illustrated in FIG. 2, or may have a rolled form.

As illustrated in FIG. 2, multi-walled carbon nanotube 232 has two wall or tubes, a first tube 212 and a second tube 214. Each tube 212, 214 has a first end 220 (e.g., proximal end) and a second end 222 (e.g., distal end). Each tube 212, 214 has sidewalls 224 extending from the first end 220 to the second end 222. Sidewalls 224 have interior surfaces 226 and exterior surfaces 228.

In FIG. 2, multi-walled carbon nanotube 232 is illustrated with two walls for clarity. In other implementations, multi-walled carbon nanotube 232 has more than two walls. For example, in some implementations, the multi-walled carbon nanotube 232 includes 5 to 15 walls. To illustrate, a sheet of graphene may be rolled 5 times to produce a multi-walled carbon nanotube having 5 walls, i.e., 5 layers of carbon atoms spaced from one another. As another example, 5 sets of carbon nanotubes (e.g., single-wall nanotubes) are concentrically arranged (e.g., nested) to form a multi-walled carbon nanotube having 5 walls, similar to multi-walled carbon nanotube 232. In other implementations, multi-walled carbon nanotube 232 includes a number of walls that is equal to: 3, 4, 5, 6, 7, 8, 9, 10, 11, 12, 13, 14, 15, 16, 17, 18, 19, or 20 walls, or more. The functionalized carbon nanotubes 132 may include or correspond to straight nanotubes, kinked nanotubes, nanotubes that contain Stone-Wales defects, or a combination thereof.

The functionalized carbon nanotubes 132 have a purity of greater than 90 percent in some implementations, i.e., a carbon content of greater than 90 percent. In other implementations, the functionalized carbon nanotubes 132 have a purity of greater than or equal to any of substantially: 80, 85, 90, or 95 percent. In a particular implementation, the functionalized carbon nanotubes 132 do not include amorphous carbon. Additionally, or alternatively, the functionalized carbon nanotubes 132 have residue metal impurities and/or metal oxide impurities of less than 10 percent. Exemplary impurities include metals Fe, Mg, Co, Al, Mo, and Mn, and/or oxides thereof. In other implementations, the functionalized carbon nanotubes 132 have residue metal impurities and/or metal oxide impurities of less than or equal to any of substantially: 20, 15, 10, or 5 percent.

In some implementations, a length of functionalized carbon nanotube 132 is less than or equal to 1.5 microns. In a particular implementation, a length of functionalized carbon nanotube 132 is less than or equal to 1.2 microns. In other implementations, a length of functionalized carbon nanotube 132 is between any two of substantially: 0.4, 0.6, 0.8, 1, 1.2, 1.4, 1.5, 1.6, 1.8, 2, 3, 4, 5, 6, 8, 10, 12, 14, or 15 microns. A length of functionalized carbon nanotubes 132 may indicate an average or mean length of all functionalized carbon nanotubes 132 or a threshold length that each functionalized carbon nanotubes 132 satisfies. Oxidizing the carbon nanotubes 122 may reduce a length of the carbon nanotubes 122, i.e., the functionalized carbon nanotubes 132 are shorter in length than the carbon nanotubes 122.

In some implementations, a width of functionalized carbon nanotubes 132 is less than or equal to 20 nm. In a particular implementation, a width of functionalized carbon nanotubes 132 is less than or equal to 13 nm. In some implementations, a length to diameter (i.e., l/D) ratio is between 20 and 100. In a particular implementation, an l/D ratio of functionalized carbon nanotube 132 is between 40 and 80.

In some implementations, the functionalized carbon nanotubes 132 have an aspect ratio from substantially 25 to substantially 500. In a particular implementation, the functionalized carbon nanotubes 132 have an aspect ratio from substantially 60 to substantially 200. Additionally or alternatively, in some implementations the functionalized carbon nanotubes 132 have a surface area (i.e., specific surface area (SSA) of area per unit mass) of between 200 to 300 meters squared per gram ($m^2/g$). In other implementations, the functionalized carbon nanotubes 132 have a surface area of greater than 600 $m^2/g$.

As illustrated in FIG. 2, multi-walled carbon nanotube 232 has a functional group 242 coupled to exterior surface 226 of the second tube 214, for clarity. In reality, multi-walled carbon nanotube 232 has a plurality of a functional groups 242 attached to sidewalls 224 thereof, thereby forming or being a functionalized carbon nanotube 132. The functional group 242 is coupled to polymer 134 (e.g., a particular polymer chain 244 or a polymer molecule). One or more functional groups 242 of functionalized carbon nanotube 132 may form covalent or polar bonds with polymer 134 and have increased bonding/affinity to polymer 134 than carbon atoms (e.g., unoxidized carbon atoms) of functionalized carbon nanotube 132. Additionally, polymer chains 244 of polymer 134 can be bonded directly to carbon atoms (e.g., oxidized carbon atoms) of functionalized carbon nanotube 132 and other polymer chains 244.

In some implementations, the functional groups 242 include or correspond to oxygen based or oxygen containing functional groups (e.g., oxygen functionalities), such as compounds that contain C—O bonds. Examples of oxygen based or oxygen containing functional groups include: alcohols (e.g., hydroxyls), ketones (e.g., carbonyls), aldehydes, acyl halides, carbonates, carboxylates, carboxylic acids, esters, methoxys, hydroperoxides, peroxides, ethers, hemiacetals, hemiketals, acetals, orthoesters, heterocycles, and orthocarbonate esters. In a particular implementation, functional groups 242 of functionalized carbon nanotube 132 include or correspond to hydroxyl groups, carboxylic acid groups, or a combination thereof.

In some implementations, an oxidation level of the functionalized carbon nanotubes 132 is between 3 and 25 wt %. The oxidation level as used herein is defined as an amount by weight (weight percent) of oxygenated functional groups covalently bound to functionalized carbon nanotubes 132. A thermogravimetric method can be used to determine the weight percent of oxygenated functional groups on (e.g., covalently bound to) the functionalized carbon nanotubes 132. For example, a particular thermogravimetric analysis (TGA) method involves heating substantially 5 mg of dried functionalized carbon nanotubes 132 at a rate of 5 degrees C. per minute from room temperature to 1000 degrees C. in a dry nitrogen atmosphere. The percentage weight loss from 200 to 600 degrees C. is taken as the percent weight loss of oxygenated functional groups. The oxygenated functional groups can also be quantified using Fourier transform infrared spectroscopy (FTIR), particularly in the wavelength range 1730-1680 $cm^{-1}$. In other implementations, the oxygen level of the functionalized carbon nanotubes 132, as determined by the above TGA method, is between any two of substantially: 1, 2, 3, 4, 5, 10, 15, 20, 25, and 30 wt %.

In some such implementations, an amount of carboxylic acid groups coupled to functionalized carbon nanotubes 132, as determined by titration, ranges from 0.02 to 0.18 millimoles/g of the functionalized carbon nanotubes. In other implementations, an amount of carboxylic acid groups coupled to functionalized carbon nanotubes 132, as determined by titration, is between any two of substantially: 0.005, 0.001, 0.02, 0.04, 0.06, 0.08, 0.10, 0.12, 0.14, 0.16, 0.18, 0.20 millimoles/g of the functionalized carbon nanotubes. Additionally or alternatively, an amount of hydroxyl groups coupled to functionalized carbon nanotubes 132, as determined by titration, ranges from 0.04 to 0.34 millimoles/g of the functionalized carbon nanotubes. In other implementations, an amount of hydroxyl groups coupled to functionalized carbon nanotubes 132, as determined by titration, is between any two of substantially: 0.005, 0.01, 0.02, 0.03, 0.04, 0.06, 0.08, 0.12, 0.16, 0.20, 0.24, 0.28, 0.32, 0.34, 0.35, 0.36, 0.37, 0.38, 0.39, 0.40 millimoles/g of the functionalized carbon nanotubes. As an illustrative, non-limiting example, Boehm titration is used to determine oxidation of functionalized carbon nanotubes 132 and/or presence of particular oxygen based functional groups 242.

In some implementations, overall oxidation on an exterior surface 226 of a sidewall 224 of functionalized carbon nanotubes 132 is between 5 and 25 weight percent (wt %) oxygen based functional groups 242. For multi-walled carbon nanotubes, exterior surfaces 226 of other sidewalls 224 (e.g., interior sidewalls 224) may have a similar overall oxidation wt % or a different (e.g., lesser) overall oxidation wt % than an exterior surface of an outermost sidewall 224. In a particular implementation, overall oxidation on an exterior surface 226 of a sidewall 224 of functionalized carbon nanotubes 132 is between 15 and 22 wt % oxygen based functional groups 242. In other implementations, overall oxidation on an exterior surface 226 of a sidewall 224 of functionalized carbon nanotubes 132 is substantially between any two of: 2, 3, 4, 5, 6, 7, 8, 9, 10, 12, 14, 15, 16, 18, 20, 22, 24, 25, 26, 27, 28, 29, or 30 wt % oxygen based functional groups 242. The overall oxidation weight percent may indicate an average or mean wt % of oxygen based functional groups 242 of all functionalized carbon nanotubes 132 or a range of overall oxidation wt % s of oxygen based functional groups 242 that each functionalized carbon nanotubes 132 satisfies.

In a particular implementation, the polymer composite 142 includes functionalized carbon nanotubes 132 from substantially 0.1% to substantially 3%, by weight of polymer composite 142. In other implementations, the polymer composite 142 includes functionalized carbon nanotubes 132 from between any two of substantially: 0.01, 0.1, 0.5, 1, 2, 3, 4, or 5%, by weight of polymer composite 142.

In some implementations, functionalized carbon nanotubes 132 may be modified to improve dispersion in the polymer composite 142 and/or adhesion to polymer 134. That is the base carbon nanotubes 122 are further modified or the functionalized carbon nanotubes 132 (e.g., the unreacted carbon atoms, attached functional groups, or both thereof) are chemically modified. For example, tuning agent 126 of FIG. 1 is applied to functionalized carbon nanotubes 132. As an illustrative, non-limiting example, functionalized carbon nanotubes 132 are reacted with an amine (e.g., an aliphatic long-chain amine) to modify or tune the attached functional groups 242 for increased interaction with polymer 134, and particularly olefins. Increasing the interaction between (e.g., bonding) the tuned functional groups 242 and the polymer 134 improves the dispersion of functionalized carbon nanotubes 132 in the polymer composite 142.

Polymer 134 may include polycarbonate (PC), polycarbonate copolymer (PC COPO), polycarbonate-siloxane copolymers, polyetherimide, polyetherimide-siloxane copolymers, polymethylmethacrylate (PMMA), polyphenylene ether (PPE)-siloxane copolymers, or a combination thereof. In a particular implementations polymer 134 includes or corresponds to a polymer having CO2-philic building blocks, such CO2 mixing or soluble polymer blocks).

Additionally or alternatively, polymer 134 may include thermoplastic polymers, copolymers, and blends thereof. The polymer 134 may include a polyester, such as a semicrystalline polymer, polyethylene terephthalate (PET), polyethylene terephthalate glycol-modified (PETG), glycol-modified poly-cyclohexylenedimethylene terephthalate (PCTG), polycyclohexylenedimethylene terephthalate (PCT), isophthalic acid-modified polycyclohexylenedimethylene terephthalate (PCTA), and Tritan™ (a combination of dimethyl terephthalate, 1,4-cyclohexanedimethanol, and 2,2,4,4-tetramethyl-1,3-cyclobutanediol from Eastman Chemical). Additionally, or alternatively, the material may include a resin, such as Xylex™ (a combination of PC and an amorphous polyester), polybutylene terephthalate (PBT) (e.g., a resin from the Valox™ line of PBT), and/or a PET resin available from SABIC™. Additionally, or alternatively, the polymer 134 may include liquid-crystal polymer (LCP), polyether ether ketone (PEEK), fluorinated ethylene propylene (FEP), polysulfone (PSU), polyethylenimine, polyimide (PI), polyethylene (PE), polypropylene (PP), cyclic olefin copolymer (COC), cyclo olefin polymer (COP), polyamide (PA), acrylonitrile butadiene styrene (ABS), or a combination thereof. The term "polycarbonate" (or "polycarbonates"), as used herein, includes copolycarbonates, homopolycarbonates and (co)polyester carbonates.

In another particular implementation, polymer 134 includes a polysiloxane block copolymers. Polysiloxane block copolymers generally comprise a first block that comprises a polysiloxane and a second block polymer that is copolymerized with the first block. Exemplary block copolymers are polycarbonate-polysiloxane block copolymers, copolyester-carbonate-polysiloxane block copolymers, polyester-polysiloxane block copolymers, polyarylate-polysiloxane block copolymers, or the like, or a combination comprising at least one of the foregoing polymers.

The polyesters used in the polyester-polysiloxane block copolymers or the copolyester-carbonate-polysiloxane block copolymers can be aliphatic polyesters or aromatic polyesters. Examples of polyesters that can be used in the polyester-polysiloxane block copolymers are polyethelene terephthalate (PET), polybutylene terephthalate (PBT), poly(1,4-cyclohexane-dimethanol-1,4-cyclohexanedicarboxylate) (PCCD), poly(trimethylene terephthalate) (PTT), poly(cyclohexanedimethanol-co-ethylene terephthalate) (PETG), poly(ethylene naphthalate) (PEN), poly(butylene naphthalate) (PBN), polyarylates, or the like, or a combination comprising at least one of the foregoing polyesters.

The polymer composite 142 may further include one or more additives (e.g., additive(s) 136) intended to impart certain characteristics to polymer foam 152. The various additives may be incorporated into polymer composite 142, with the proviso that the additive(s) are selected so as to not significantly adversely affect the desired properties of polymer composite 142 (e.g., the additives have good compatibility with the polymer 134 and functionalized carbon nanotubes 132). For example, the additive(s) selected do not significantly adversely affect bonding between polymer 134 and functionalized carbon nanotubes 132, foaming, or electrical conductivity.

As illustrative, non-limiting examples, polymer composite 142 may include one or more additives (e.g., 136), such as an impact modifier, flow modifier, antioxidant, thermal (e.g., heat stabilizer), light stabilizer, ultraviolet (UV) light stabilizer, UV absorbing additive, plasticizer, lubricant, antistatic agent, antimicrobial agent, colorant (e.g., a dye or pigment), surface effect additive, radiation stabilizer, or a combination thereof. The additives may include impact modifiers such as styrene-butadiene thermoplastic elastomers, fire-retardant additives, colorants, thermal stabilizers, antioxidants, antistatic agents and flow promoters. Such additives can be mixed at a suitable time during the mixing of the components for forming the polymer composite 142.

As an illustrative, non-limiting example, addition of one or more compatibilizers capable of reacting with oxygen based functional groups 242 will improve adhesion to polymer 134. In a particular implementation, compatibilizers capable of reacting with carboxylic acid functional groups 242 of functionalized carbon nanotubes 132 will improve adhesion to the polymer 134. In a particular implementation, glycidyl methacrylate (GMA)-based compatibilizers, such as Lotader AX8900, polyolefins, or PBT compositions are added to react with oxygen based functional groups 242 of functionalized carbon nanotubes 132.

In some implementations, polymer composite 142 includes functionalized carbon nanotubes 132 from substantially 0.1% to substantially 10% by weight of the polymer composite 142. In a particular implementation, polymer composite 142 includes functionalized carbon nanotubes 132 in an amount less than or equal to 5 wt %. In another implementation, polymer composite 142 includes functionalized carbon nanotubes 132 in an amount less than or equal to 3 wt %.

Thus, polymer composite 142 has increased bonding and adhesion between polymer 134 and functionalized carbon nanotubes 132 thereof by incorporating the functionalized carbon nanotubes 132 described herein into polymer composite 142. The increased bonding and adhesion increases porosity and mechanical properties of foams made using polymer composite 142. For example, foams and parts made from polymer composite 142 may have lower weights and densities than parts made from conventional polymer compositions.

Figure 3:
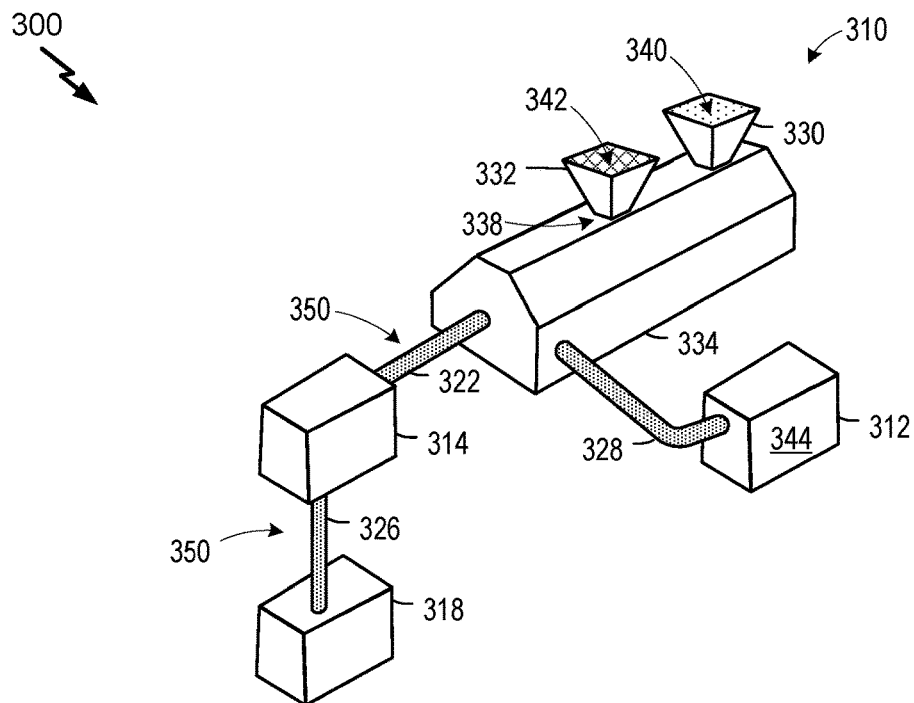
FIG. 3 is a perspective view of an example of a system for producing polymer foam.

Referring to FIG. 3, an example of a system 300 for producing polymer foam is shown. System 300 is configured to use an extrusion process to form a polymer composition (e.g., polymer composite 142) and an extrusion foaming process to form the polymer foam 152 from the polymer composite 142, as described herein. System 300 includes an extruder 310, a fluid chamber 312, an injector 314, and a die 318 (e.g., a mold). Extruder 310 is coupled to injector 314 via one or more conduits 322, such as one or more tubes. Injector 314 is coupled to die 318 via one or more conduits 326, such as one or more tubes. Fluid chamber 312 is coupled to extruder 310 via one or more conduits 328, such as one or more tubes.

Extruder 310 includes one more hoppers, such as a first hopper 330 and a second hopper 332, and a barrel 334 coupled to the one or more hoppers. For example, barrel 334 may be coupled to a hopper via a feed throat 338. Each hopper 330, 332 is configured to receive material (e.g., pellets, granules, flakes, powders, and/or liquids) that is provided (e.g., gravity fed or force fed) from the hopper to barrel 334 via a corresponding feed throat 338. As shown, first hopper 330 has received a first material 340 and second hopper 332 has received a second material 342. First material 340 includes a polymer, such as polymer 134, and second material 342 includes functionalized carbon nanotubes 132. Although described as being provided to separate hoppers, in other implementations, first and second materials 340, 342 may be provided by the same hopper.

In some implementations, another material can be combined with first and second materials 340, 342 in the extruder 10. For example, the other material may be received by the extruder 310 via the one or more hoppers. The other material can include one or more additive(s) 136, such as an impact modifier, flow modifier, antioxidant, heat stabilizer, light stabilizer, ultraviolet (UV) light stabilizer, UV absorbing additive, plasticizer, lubricant, antistatic agent, antimicrobial agent, colorant (e.g., a dye or pigment), surface effect additive, radiation stabilizer, or a combination thereof, as illustrative, non-limiting examples.

Each hopper 330, 332 provides its corresponding material 340, 342 into barrel 334 where the materials are combined to form a polymer composite 350. For example, the materials are gradually melted in barrel 334 by the mechanical energy (e.g., pressure) generated by turning screws, by heaters arranged along barrel 334, or both. The molten materials are mixed together (e.g., blended) to form polymer composite 350. Polymer composite 350 may include or correspond to polymer composite 142.

Fluid chamber 312 is configured to store fluid under pressure and provide fluid to barrel 334. In some implementations, after first and second materials 340, 342 are combined in barrel 334, fluid chamber 312 provides a soluble fluid 344 (e.g., a fluid soluble in the polymer of first material 340) to barrel 334 via conduit 328. Soluble fluid 344 dissolves in at least one of first and second materials 340, 342 to saturate at least one of first and second materials 340, 342 and form a saturated-polymer composite 350. In other implementations, soluble fluid 344 is provided to first material 340 prior to introduction of second material 342. In such implementations, first material 340 dissolves soluble fluid 344 and saturated first material 340 is combined/mixed with second material 342 to form saturated-polymer composite 350. The soluble fluid 344 may include or correspond to a foaming agent.

As used herein, the term "foaming agent" is defined as a chemical or a physical agent that is used to foam a polymer, often referred to as a blowing agent. The foaming agent may be a gas, a solid, a liquid, or a supercritical foaming agent. A foaming agent is used to form the polymer foam. Foaming agents that may be used include inorganic agents, organic agents and other chemical agents. Suitable inorganic foaming agents include carbon dioxide, nitrogen, argon, water, air, nitrogen, and inert gases such as helium and argon. Organic agents include aliphatic hydrocarbons having 1-9 carbon atoms, aliphatic alcohols having 1-3 carbon atoms, and fully and partially halogenated aliphatic hydrocarbons having 1-4 carbon atoms.

In an implementation, the foaming agent may be selected from the group consisting of carbon dioxide, air, nitrogen, argon, gaseous hydrocarbons, and combinations thereof. The foaming agent may be selected from the group consisting of solid carbon dioxide, liquid carbon dioxide, gaseous carbon dioxide, or supercritical carbon dioxide. Any of the inert gases, such as for example, helium, xenon, and argon may be used. Non-limiting examples of gaseous hydrocarbons include methane, ethane, propane, and butane. In another implementation, halohydrocarbons that would be expected to be in a gaseous form at ambient temperature and pressure may be used. Examples of such halohydrocarbons include fluorohydrocarbons, fluorocarbons, chlorocarbons, and chlorofluorocarbons.

Saturated-polymer composite 350 is provided from barrel 334 via conduit 322 to injector 314. Injector 314 injects saturated-polymer composite 350 into die 318 via conduit 326. Saturated-polymer composite 350 flows into the die 318 until the polymer composite 350 substantially fills the die 318, such as one or more cavities or features thereof. The saturated-polymer composite 350 cools to form polymer foam 152.

In some implementations, pore sizes can be adjusted/controlled by quenching the nanoporous foam during expansion. For example, when melt blending is conducted in an injection-molding machine, the die 318 may be set to a temperature that is less than or equal to the glass transition temperature of polymer 134.

As shown, saturated-polymer composite 350 is provided from extruder 310 to die 318 via injector 314. In other implementations, system 300 may not include an injector and extruder 310 may provide saturated-polymer composite 350 to die 318 via one or more conduits. Although polymer composite 350 has been described in system 300 using an extrusion process, in other implementations, polymer composite 350 may be formed by another process and provided to injector 314 for injection into die 318.

As described with reference to FIG. 3, system 300 is configured to form polymer foam. The polymer foam includes a polymer composite (including the polymer and the functionalized carbon nanotubes) that may advantageously have increased pore density and reduced weight. For example, the polymer foam has increased impact resistance as compared to polymer foam made from polymer compositions having conventional carbon nanotubes. Additionally, the polymer foam may have a designed conductivity and may be electrically conductive, anti-static, or EMI shielding.

When producing polymer foam 152 by an extrusion technique, it may be desirable that a total time for forming the saturated-polymer composite 142 (e.g., "homogeneous phase" material), such as from soluble fluid 344 impregnating polymer particles to being ejected by extruder 310, is less than the time taken for soluble fluid 344 molecules to diffuse out of the polymer particles.

In other implementations, the extruder 310 forms extrudate (e.g., strands of polymer composite 142) which is then cooled in a water bath, or by spraying the extrudate in a conduit 322 (e.g., a conveyor belt) as the extrudate moves from extruder 310 to a granulator via conduit 322. The granulator breaks the extrudate (e.g., the strands thereof) into pieces, such as pellets. The pellets of polymer composite 142 include trapped soluble fluid 344 and correspond to beads (e.g., expanded beads or bead foams) and can be used in a bead foaming process.

In yet another implementation, first material 340 or polymer composite 350, in solid state is saturated with soluble fluid 344 in a pressure vessel to form saturated-first material 340 or saturated-polymer composite 350. The saturated polymer-composite 350 is then heated by a heating device to induce foaming of the polymer composite 350 by the soluble fluid 344 and to form polymer foam 152. For example, soluble fluid 344 undergoes nucleation and growth in the polymer to form polymer foam 152.

The operations of FIG. 3 described above can be implemented in a batch, semi-batch, or a continuous manner. Continuous methods are often more desirable since they may allow for better process control and production of polymer foams.

Figure 4:
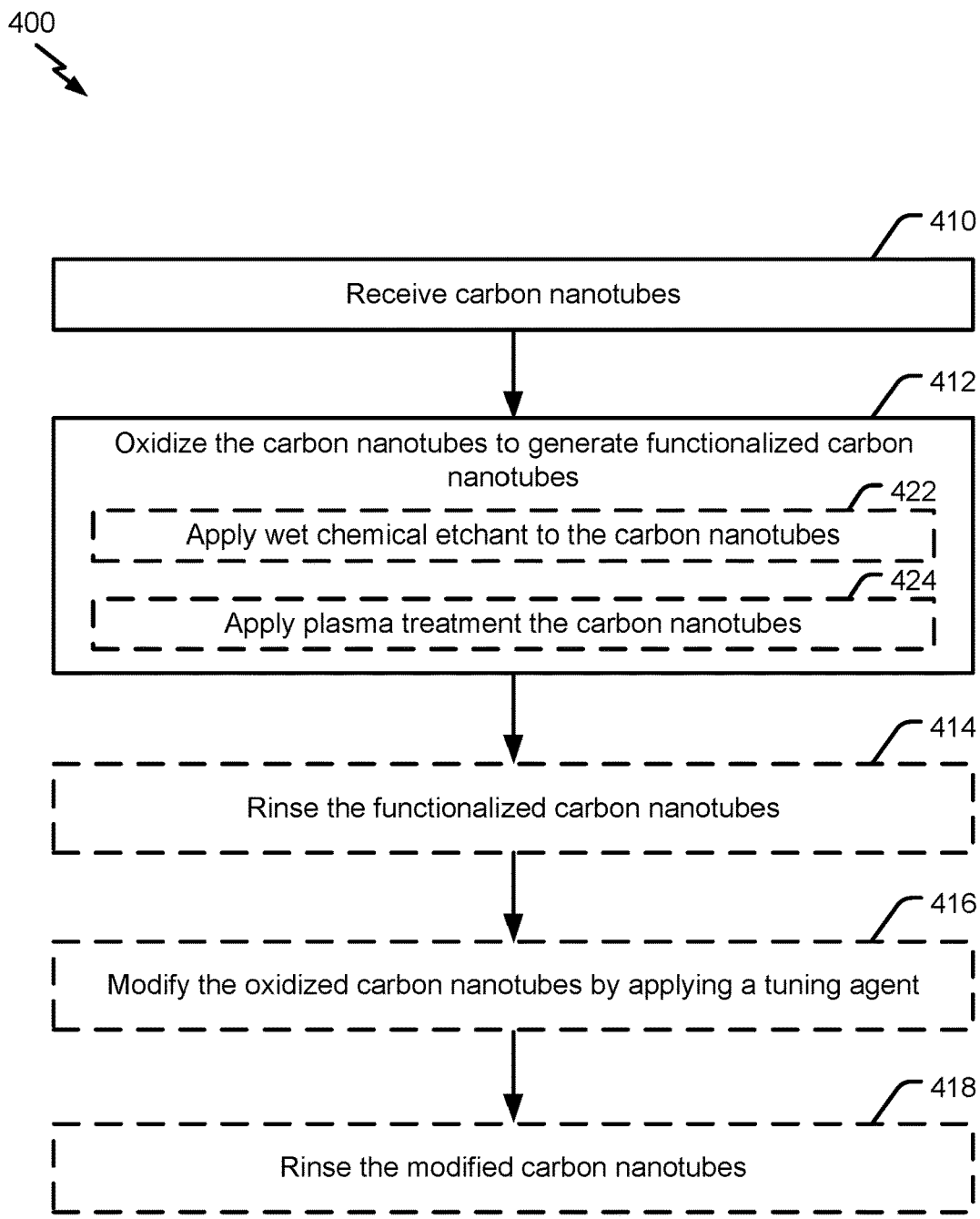
FIG. 4 is a flowchart illustrating an example of a method of manufacturing functionalized carbon nanotubes.

Referring to FIG. 4, an example of a method of manufacturing functionalized carbon nanotubes is shown. Method 400 may be performed by a manufacturing device or system, such as system 100 (e.g., CNT modification system 112 and/or electronic device 118). The functionalized carbon nanotubes may include or correspond to functionalized carbon nanotubes 132, as described herein.

Method 400 includes receiving carbon nanotubes, at 410. The carbon nanotubes may include or correspond to carbon nanotubes 122 and may be double-walled carbon nanotubes or multi-walled carbon nanotubes, or a combination thereof. In some implementations, method 400 optionally includes growing or forming the carbon nanotubes For example, carbon nanotubes 122 are grown by a CVD process. Method 400 also includes oxidizing the carbon nanotubes to generate functionalized carbon nanotubes, at 412. For example, oxidizing agent 124 is applied to carbon nanotubes 122 in liquid or plasma form and carbon nanotubes 122 are oxidized by oxidizing agent 124 to form oxygen based functional groups 242 thereon to generate functionalized carbon nanotubes 132.

In some implementations, oxidizing the carbon nanotubes includes at applying a wet chemical etchant to the carbon nanotubes, at 422. For example, oxidizing agent 124, such as nitric acid or nitric acid and sulfuric acid, is applied a liquid etchant to carbon nanotubes 122. In other implementations, oxidizing the carbon nanotubes includes applying plasma treatment the carbon nanotubes, at 424. For example, nitric acid plasma is applied to carbon nanotubes 122.

In some implementations, method 400 further includes rinsing the functionalized carbon nanotubes, at 414. For example, the functionalized carbon nanotubes 132 are rinsed in an ultrasonic bath with ultrapure water. Rinsing the functionalized carbon nanotubes 132 may remove containments. In some implementations, method 400 further includes modifying the functionalized carbon nanotubes by applying a tuning agent, at 416. For example, the functionalized carbon nanotubes 132 are chemically reacted with tuning agent 126, such as an amine, to modify functional groups 242 of the functionalized carbon nanotubes 132 for increased adhesion to polymer 134. In some implementations, method 400 further includes rinsing the modified carbon nanotubes, at 418. For example, the functionalized carbon nanotubes 132 are rinsed in a second ultrasonic bath with ultrapure water after treatment with tuning agent 126.

One product or article of manufacture that can be formed from method 400 includes polymer composite 142. Rinsing the functionalized carbon nanotubes 13 may remove containments.

Thus, method 400 describes manufacturing of functionalized carbon nanotubes 132. Method 400 advantageously enables improved bonding of the functionalized carbon nanotubes 132 to polymers (e.g., polymer 134) to form improved polymer compositions (polymer composite 142) with improved adhesion and dispersion for reducing or preventing cell wall and/or strut collapse.

Figure 5:
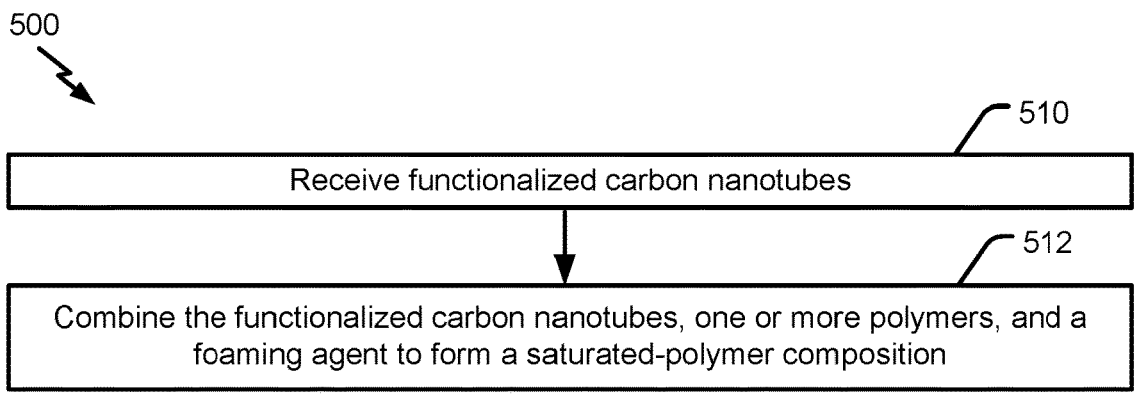
FIG. 5 is a flowchart illustrating an example of a method of manufacturing a saturated-polymer composition including functionalized carbon nanotubes.

Referring to FIG. 5, an example of a method of manufacturing a saturated-polymer composition is shown. Method 500 may be performed by a manufacturing device or system, such as system 100 (e.g., combiner 114 and/or electronic device 118) and/or system 300 (e.g., extruder 310). The polymer composition may include or correspond to polymer composite 142 or polymer composite 350 saturated with a foaming agent (e.g., soluble fluid 344), as described herein.

Method 500 includes receiving functionalized carbon nanotubes, at 510. Method 500 also includes combining the functionalized carbon nanotubes, one or more polymers, and a foaming agent to form a saturated-polymer composition, at 512. One product or article of manufacture that can be formed from method 500 includes polymer foam 152.

Thus, method 500 describes manufacturing of a saturated-polymer composition, such as polymer composite 142. Method 500 advantageously enables creating a saturated-polymer composition with increased polymer to nanotube bonding such that foams (including the functionalized carbon nanotubes) with increased porosity and mechanical properties can be formed, such as polymer foam 152.

Figure 6:
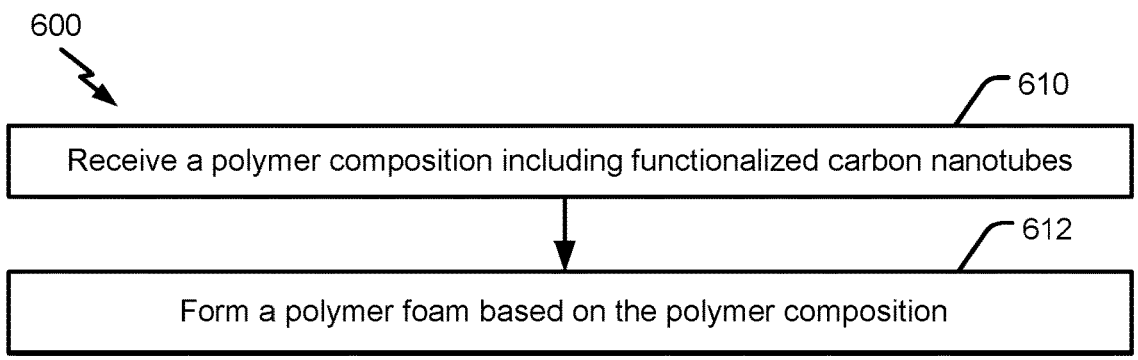
FIG. 6 is a flowchart illustrating an example of a method of manufacturing polymer foam using a polymer composition including functionalized carbon nanotubes.

Referring to FIG. 6, an example of a method of manufacturing a polymer foam is shown. Method 600 may be performed by a manufacturing device or system, such as system 100 (e.g., forming system 116 and/or electronic device 118) and/or system 300. The polymer foam may include or correspond to polymer foam 152, as described herein.

Method 600 includes receiving a polymer composition including functionalized carbon nanotubes, at 610. For example, the polymer composition may include or correspond to polymer composite 142 or polymer composite 350, and the polymer composition may be saturated with a foaming agent, such as saturated-polymer composite 350 including soluble fluid 344. In such implementations where polymer composition is not saturated, a foaming agent, such as soluble fluid 344, is dissolved in the polymer composition, as described with reference to FIGS. 3 and 4. The functionalized carbon nanotubes may include or correspond to functionalized carbon nanotubes 132.

Method 600 also includes forming a polymer foam based on the polymer composition, at 612. For example, saturated-polymer composite 142 is in a molten state when applied to the mold 144 or die 318 and soluble fluid 344 thereof undergoes nucleation and growth in polymer 134 of saturated-polymer composite 350 to form polymer foam 152. During nucleation and growth, functionalized carbon nanotubes 132 bonded to polymer 134 reduce and/or prevent cell wall and/or cell strut collapse during formation of cells to form polymer foam 152 with increased porosity.

Polymer foam 152 can be manufactured in a continuous process or a batch process. In an exemplary continuous process, polymer 134 is fed into a device (e.g., extruder 310) that can apply shear force, extensional force, compressive force, ultrasonic energy, electromagnetic energy and/or thermal energy to polymer 134. During the application of these forces and forms of energy to polymer 134, polymer 134 reaches a temperature above its flow point and melts. Soluble fluid 344 is introduced into the device and dissolves in polymer 134 under pressure to form fluid saturated-polymer 134, such as $CO_2$ saturated-polymer 134. Upon being ejected from the device, the fluid undergoes nucleation and growth in polymer 134 to produce a nanoporous foam.

Melt blending of polymer 134 involves the use of shear force, extensional force, compressive force, ultrasonic energy, electromagnetic energy, thermal energy or combinations comprising at least one of the foregoing forces or forms of energy, and is conducted in processing equipment wherein the aforementioned forces or forms of energy are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least two of the foregoing.

Melt blending involving the aforementioned forces may be conducted in machines such as single or multiple screw extruders, Buss kneaders, Henschel mixers, helicones, Ross mixers, Banbury, roll mills, molding machines such as injection molding machines, vacuum forming machines, blow molding machines, or the like, or a combination comprising at least one of the foregoing machines. In one implementation, the melt blending is conducted in an extruder. In another implementation, the melt blending is conducted in an injection-molding machine. In an exemplary batch process implementation, polymer 134 in solid form is immersed in soluble fluid 344 under pressure for a period of time to form a fluid-saturated-polymer 134. Upon removal of pressure, the soluble fluid 344 undergoes nucleation and growth to form the nanoporous foam.

Method 600 may further include combining, at an extrusion device, the polymer and the additive to form the polymer composition. For example, the extrusion device may include or correspond to extruder 310. In some such implementations, method 600 also includes providing, from the extrusion device to an injection device, the polymer composition for injection into the mold. For example, the injection device may include or correspond to injector 314. In other implementations, the extrusion device may inject the polymer composition into the mold.

Thus, method 600 describes manufacturing of a polymer foam, such as polymer foam 152 having increased pore density (porosity) and reduced weight. Method 600 advantageously enables forming polymer foams with increased pore density and reduced weight. Additionally, or alternatively, the polymer foam may be electrically conductive.

One exemplary use of the polymer foam, such as polymer foam 152, is as thermal insulation (e.g., incorporated into thermal insulation material). The polymer foam has good insulation properties (e.g., lower than that of gasses) and low density. The polymer foam may provide the increased thermal insulation because of the Knudsen effect. Another exemplary use of the polymer foam is as membranes and/or filters. Open cell polymer foams can be used as battery separators because they can hinder the transport of ions in narrow channels of the open cells. Surfaces of the nanocellular polymer foam can be used to support catalysts and reactions due to the polymer foam's high surface area. Polymer foam can be designed to filter specific particles based on tuning cell size to match a size of the particle being filtered. The polymer foams described herein may have a higher impact resistance when compared to microcellular foams. The higher impact resistance can be caused by the confinement effect and functionalized carbon nanotube reinforcement. In particular implementations, the polymer foam can exhibit transparency to a particular portion of electromagnetic radiation and/or have a high reflectance for a particular portion of electromagnetic radiation.

It is noted that one or more operations described with reference to one of the methods of FIGS. 4-6 may be combined with one or more operations of another of FIGS. 4-6. For example, one or more operations of method 400 may be combined with one or more operations of method 600. Additionally, one or more of the operations described with reference to the systems of FIGS. 1 and 3 may be combined with one or more operations described with reference to one of the methods of FIGS. 4-6.

Although, the above examples of polymer foams have been described with reference to examples including functionalized carbon nanotubes (and optionally non-functionalized carbon nanotubes), in other implementations the polymer foams described herein include non-functionalized carbon nanotubes and may not include functionalized carbon nanotubes.

For example, the functionalized carbon nanotubes 132 of the polymer composite 142 and polymer foam 152 of FIG. 1 may be replaced with non-functionalized carbon nanotubes. To illustrate, the polymer composite 142 of FIG. 1 may have similar concentrations of non-functionalized carbon nanotubes as to the described concentrations for functionalized carbon nanotubes. Similarly, a polymer foam including non-functionalized carbon nanotubes may be formed in a manner similar to polymer foam 152 of FIG. 1

Additionally, or alternatively, the non-functionalized carbon nanotubes may have similar features to the features described with reference to the functionalized carbon nanotubes 132 as described with reference to FIGS. 1 and 2. To illustrate, the non-functionalized carbon nanotube may have a similar scale and dimensions, made of similar materials, or both. The non-functionalized carbon nanotubes do not have such functional groups or oxygen groups attached thereto, such as in the concentrations described with reference to FIG. 1.

The non-functionalized carbon nanotubes may be formed or grown in a similar manner to the functionalized carbon nanotubes 132, and may not be subjected to oxidation/functionalization operations. Accordingly, such non-functionalized carbon nanotubes are less costly to produce as compared to the functionalized carbon nanotubes 132.

It has been found that non-functionalized carbon nanotubes of particular scales and dimensions offer similar benefits and improved performance for polymer foams as functionalized carbon nanotubes when compared to conventional carbon nanotube polymer foams. To illustrate, for some lengths of non-functionalized carbon nanotubes, such as 0.4 to 14 microns, the resulting non-functionalized carbon nanotube polymer foams may retain a large portion of the benefit (e.g., 80 percent) of functionalized carbon nanotube polymer foams for significantly reduced costs (e.g., 50 percent). For example, such non-functionalized carbon nanotube polymer foams may have improved pore density and pore size, and improved physical properties, such as conductivity and toughness. Other length ranges of non-functionalized carbon nanotubes offer improved performance as well, such as 1 to 10 microns and 1 to 5 microns.

As another illustration, lower aspect ratio non-functionalized carbon nanotubes may also improve performance of the polymer foams. To illustrate, non-functionalized carbon nanotubes of less than 100, less than 50, and less than 30 may offer improved performance for polymer forms in addition to or in the alternative of the lengths described above. Accordingly, the non-functionalized carbon nanotube polymer foam implementations described herein offer improved performance over conventional polymer foams and offer similar performance to functionalized carbon nanotube polymer foams for reduced costs. Thus, such non-functionalized carbon nanotube polymer foam implementations may be suited for cost controlled or cost focused products.

The above specification and examples provide a complete description of the structure and use of illustrative implementations. Although certain implementations have been described above with a certain degree of particularity, or with reference to one or more individual implementations, those skilled in the art could make numerous alterations to the disclosed implementations without departing from the scope of this disclosure. As such, the various illustrative implementations of the methods and systems are not intended to be limited to the particular forms disclosed. Rather, they include all modifications and alternatives falling within the scope of the claims, and implementations other than the one shown may include some or all of the features of the depicted implementations. For example, elements may be omitted or combined as a unitary structure, connections may be substituted, or both. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one implementation or may relate to several implementations. Accordingly, no single implementation described herein should be construed as limiting and implementations of the disclosure may be suitably combined without departing from the teachings of the disclosure.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A polymer foam comprising:
   one or more polymers, wherein at least one polymer of the one or more polymers is selected from the group consisting of polycarbonate, polycarbonate-siloxane copolymers, polyetherimide, polyetherimide-siloxane copolymers, polymethylmethacrylate (PMMA), polyphenylene ether (PPE)-siloxane copolymers, and a combination thereof, and wherein the at least one polymer of the one or more polymers includes a polycarbonate-siloxane copolymer, a polyetherimide-siloxane copolymer, or a polyphenylene ether (PPE)-siloxane copolymer; and
   functionalized carbon nanotubes, the functionalized carbon nanotubes having multiple walls and one or more oxygen based functional groups,
   wherein the polymer foam has an average pore size within a range of 10 nanometers to 100 microns.

2. The polymer foam of claim 1, wherein the polymer foam has an average pore size of greater than 10 nanometers and less than or equal to 100 nanometers.

3. The polymer foam of claim 1, wherein the polymer foam has a cell density of greater than or equal to 10E12 cells per cubic centimeter.

4. The polymer foam of claim 1, wherein the polymer foam has a foam density within a range of 1 percent to 50 percent of a bulk density of a material comprising the polymer foam.

5. The polymer foam of claim 1, wherein the polymer foam comprises a thermal conductivity of 0.001 to 0.01 Watts per meter-Kelvin.

6. The polymer foam of claim 1, wherein the functionalized carbon nanotubes are dispersed in the one or more polymers, the polymer foam, or both.

7. The polymer foam of claim 1, wherein the functionalized carbon nanotubes are aligned with each other in the one or more polymers, the polymer foam, or both.

8. The polymer foam of claim 1, wherein cells of the polymer foam comprise an open cell structure, a closed cell structure, or a combination thereof.

9. The polymer foam of claim 1, further comprising carbon black, carbon fibers, graphene, non-functionalized multi-wall carbon nanotubes, single-walled functionalized or non-functionalized carbon nanotubes, or a combination thereof.

10. The polymer foam of claim 1, wherein the functionalized carbon nanotubes have one or more characteristics selected from the group of: a length between 0.4 to 15 microns, include 2 to 15 walls, an oxidation level between 3 and 25 wt % as determined by thermogravimetric analysis (TGA), or a combination thereof.

11. A method of forming a polymer foam, the method comprising:
receiving a polymer composition including one or more polymers and functionalized carbon nanotubes, the functionalized carbon nanotubes having multiple walls and one or more oxygen based functional groups, wherein at least one polymer of the one or more polymers is selected from the group consisting of: polycarbonate, polycarbonate-siloxane copolymers, polyetherimide, polyetherimide-siloxane copolymers, polymethylmethacrylate (PMMA), polyphenylene ether (PPE)-siloxane copolymers, and a combination thereof, and wherein the at least one polymer of the one or more polymers includes a polycarbonate-siloxane copolymer, a polyetherimide-siloxane copolymer, or a polyphenylene ether (PPE)-siloxane copolymer; and
forming the polymer foam based on the polymer composition,
wherein the polymer foam has an average pore size within a range 10 nanometers to 100 microns.

12. The method of claim 11, wherein forming the polymer foam based on the polymer composition includes processing the polymer composition by a solid state foaming process, an extrusion foaming process, a bead foaming process or an injection molding foaming process.

13. The method of claim 11, further comprising:
combining, at an extrusion device, the one or more polymers, the functionalized carbon nanotubes, and a foaming agent to form a saturated-polymer composition.

14. A polymer foam formed by the method of claim 11.

15. The polymer foam of claim 1, wherein the functionalized carbon nanotubes have a length between 0.4 to 15 microns and include 2 to 15 walls.

16. The polymer foam of claim 1, wherein the functionalized carbon nanotubes have an oxidation level between 3 and 25 wt % as determined by thermogravimetric analysis (TGA).

17. The method of claim 13, further comprising:
providing, from the extrusion device to a die, the saturated-polymer composition, wherein the foaming agent undergoes nucleation and expansion in the saturated-polymer composition to form the polymer foam.

18. The polymer foam of claim 1, wherein the at least one polymer of the one or more polymers is a polycarbonate-siloxane copolymer.

* * * * *